May 10, 1949.  A. R. SHAY  2,469,479
ELECTRIC SOLDERING IRON
Filed May 10, 1946                                           2 Sheets-Sheet 1
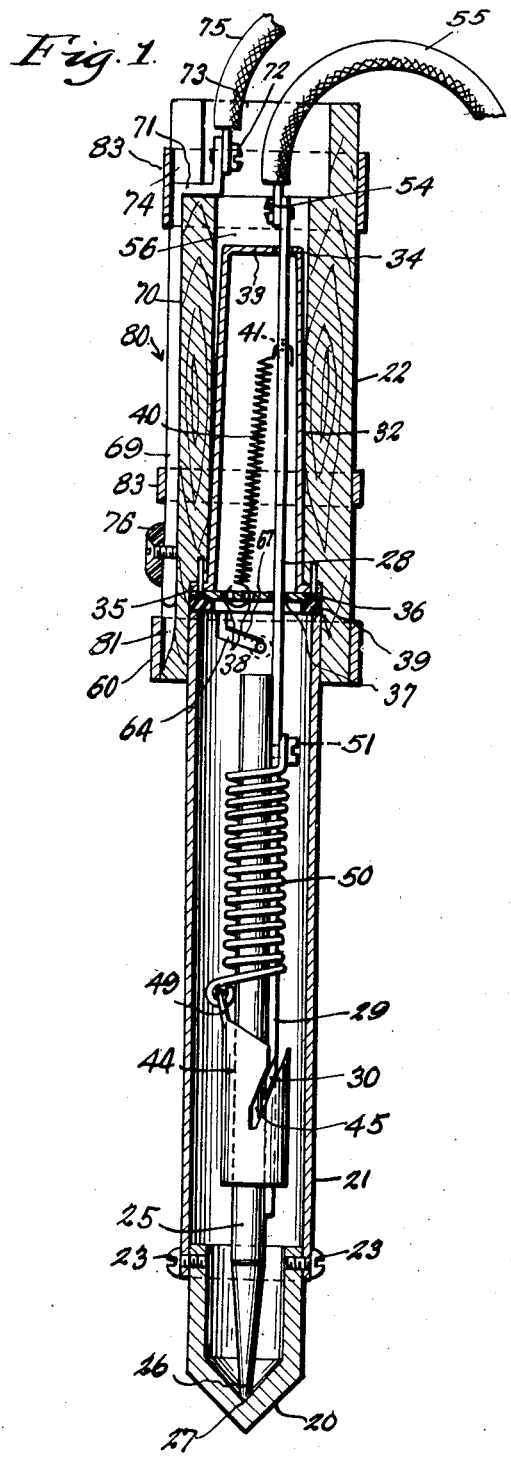
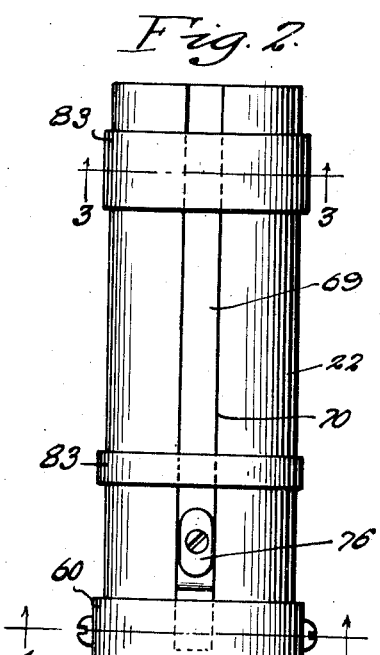
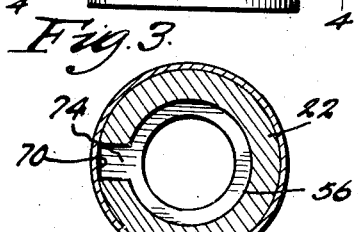
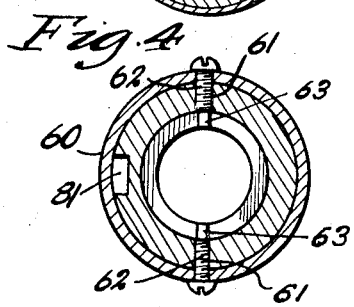
Inventor
ALBERT R. SHAY
By *Clarence A. O'Brien and Harvey B. Jackson*
Attorneys May 10, 1949.  A. R. SHAY  2,469,479
ELECTRIC SOLDERING IRON
Filed May 10, 1946  2 Sheets—Sheet 2
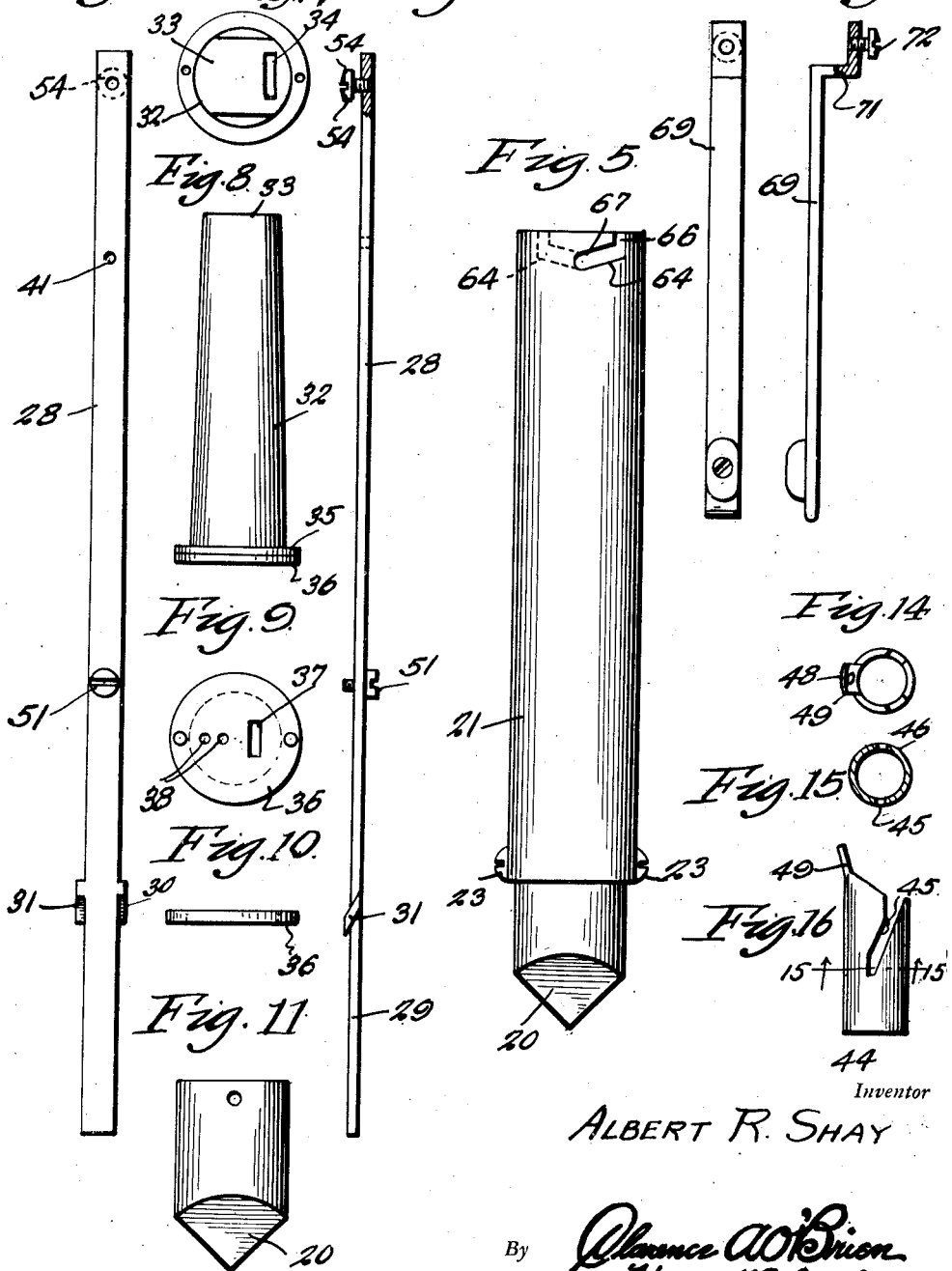
Inventor
ALBERT R. SHAY
By Clarence A. O'Brien
and Harvey B. Jacobson
Attorneys Patented May 10, 1949

2,469,479

UNITED STATES PATENT OFFICE 2,469,479

ELECTRIC SOLDERING IRON

Albert R. Shay, Mantua, Ohio

Application May 10, 1946, Serial No. 668,709

4 Claims. (Cl. 219—26)

This invention relates to electric soldering irons and it has for its main object to provide a soldering iron of a simple construction which can be brought to the required degree of heating for performing soldering work instantaneously or within an extremely short period.

A further object of the invention consists in providing a soldering iron which may be used without the usual stand on which soldering irons have to be placed during work pauses to keep them heated or partly heated, and which will be operated solely by a switch associated with it, the required degree of heat in the soldering tip being produced instantaneously upon closure of the switch.

A further object of the invention is to provide a soldering iron which may be operated in the manner aforedescribed on a low voltage battery or a low volt transformer, for instance on the 6-volt battery of a car and which may, therefore, be used with great advantage as part of the tool outfit of a car.

A further object of the invention consists in providing a soldering iron of a simple construction adapted to stand rough handling without getting out of order.

Further objects will be apparent in the course of the more detailed specification.

According to my invention, the heating of the soldering iron is obtained by providing a carbon electrode directly applied against the tip piece of the soldering iron and held there permanently under pressure. The tip of the carbon electrode may be pointed and said tip may be applied with advantage against the tip or apex of the cavity of the tip piece, which, as a rule, has the shape of a pyramid or cone. In spite of the consumption of the carbon electrode, the latter is permanently held against the tip piece by an electrode holder which is under spring pressure and to which the electrode is clamped by means of a special clamping device securing tight clamping and good contact between the parts. Likewise the electrode holder according to my invention secures a good electrical connection which may be controlled by a hand switch arranged on the handle of the soldering iron.

Further features will be apparent from the following detailed description of one embodiment of my invention. It is, however, to be understood that the fact that merely one embodiment of the invention is shown is not to be regarded as limitative. The description refers to the modification shown in the drawings merely by way of example and other embodiments will, therefore, be suggested to experts skilled in this art which do not form a departure from my invention.

In the accompanying drawings:

Figure 1 is an elevational sectional view of the soldering iron, with the section taken along a vertical plane of symmetry.

Figure 2 is a plan view of the handle containing the switch.

Figures 3 and 4 are sectional views of the handle, the sections being taken along lines 3—3 and 4—4, respectively.

Figures 5 to 17 are views of details.

The soldering iron according to the invention comprises a soldering tip piece 20 usually made of copper, which is fixed to a metallic sleeve or neck piece 21 carried by a handle 22. The tip piece 20 is fixed to the said neck piece by means of screws 23 which also serve to transmit current to the tip.

The resistance which will heat up the soldering tip piece instantly when the current is switched in and will keep it heated during its use, consists of a carbon rod 25 with a pointed tip 26 which is applied against the soldering tip 20. As a rule, soldering tips are provided with ends forming a regular pyramid over a square base, the apex of which forms the tip to be used during work. They are, moreover, hollow with similar or conical surfaces on the inside. The tip 26 of the carbon electrode 25 is preferably applied against the apex 27 of this inner surface, and the reduced cross section offered to the passage of current at this point in combination with the relatively poor specific conductivity of the carbon produces an intense heat which will be transmitted to the copper tip piece.

In order to advance the carbon electrode which will be slowly consumed and in order to keep the electrode in the longitudinal alignment within the neck piece or sleeve 21 and tip 20 a movable electrode holder 28 is provided which is secured within the handle 22 in a manner to be described and has a free end 29 projecting into the interior of the neck piece 21. This holder consists of a strip of metal as shown in Figures 6 and 7 provided with two lugs 30, 31 projecting therefrom. The lugs may be inclined with respect to the holder for a purpose to be described. For movably securing the holder within the handle, a guide sleeve 32 is provided in the interior of said handle which may be closed at one end, the closing bottom 33 being, however, provided with a slot 34 through which the electrode holder 28 passes. The other end may be provided with flanges 35 to which a disk 36 (Figures 9 and 10) is secured which covers the open end of sleeve 32 and which is provided with a slot 37 similar to slot 34 and serving the same purpose.

The disk 36 may be of metal and in order to insulate it from the sleeve 21 an insulating annular disk 39 may be provided which is pressed against the disk 36 when the sleeve 21 is secured to the handle in a manner to be described later.

The electrode holder is thus slidably held at two points in the slots 34 and 37 provided in the closing means of the guide sleeve.

The disk 36 is moreover provided with holes 38 or with protuberances for holding the end of a spiral spring 40, the other end of which is secured to the electrode holder 28 by means of a hole 41 into which the spring is hooked or by means of a protuberance which it engages. The spring will draw the electric holder 28 towards the tip 20 along a line which is fixed by the two slots 34 and 37 in disk 36 and bottom 33, respectively.

The carbon electrode 25 is fixed on the electrode holder by means of a clamping sleeve 44 which is provided with inclined slots 45, 46 engaging the inclined lugs 30, 31 on the holder. At its rear end the clamping sleeve 44 is provided with a lug 49 having an eye 48 into which the end of a strong spiral spring 50 is hooked. The other end of said spring is fixed on the electrode holder 28 by means of a screw 51 or by other appropriate means.

It will be seen from Figure 1 that the spring 50 which draws the clamping sleeve backwards by means of the inclined slots 45, 46 and lugs 30, 31 also presses an electrode passing through the clamping sleeve firmly against the holder 28. The electrode 25 and the holder 28 thus form a unit advancing automatically against the tip as the consumption of the electrode progresses. This firm contact between the electrode holder, the clamping sleeve and the electrode also secures a good electric contact between these parts.

For supplying the electrode holder 28 and the electrode 25 with current, the former is provided with a terminal screw 54 connected with a line wire 55.

As already mentioned the tool is provided at its rear end with a handle 22 which surrounds the guiding sleeve 32 and in which the neck piece or sleeve 21 is fixed. The handle 22, therefore, consists of a cylindrical or prismatic piece of insulating material (Figures 2 to 4) which is provided with a central bore 58 into which the guide piece 32 may be fitted. On one end it is provided with a metal ring 60 which is provided with holes 61 through which screws 62 are passing which are screwed into the handle. These screws are provided at their ends with smooth pin-like projections 63 which enter into a slot 64 at the end of the neck piece or sleeve 21. These slots may be formed in a manner well known and called bayonet-slot, which comprises a short longitudinal stretch 66 and a circular portion 67 preferably slightly inclined towards the longitudinal axis of the sleeve. The projecting pins 63 are brought into engagement with the inclined slot portions 67 through the longitudinal slots 66, the sleeve 21 being turned until the said slots 66 are facing the pins. By pushing the sleeve 21 towards the pins and then turning the sleeve around a firm hold and a good electrical contact are secured.

The handle 22, moreover, houses a switch 80 for controlling the heating of the soldering iron during work. This switch consists of a switch tongue 69 (Figures 12 and 13), adapted to slide longitudinally in a groove 70 of the handle. This groove may run alongside the handle. At its front end, below the ring 60 the depth of the groove decreases as shown at 81 for a purpose to be described.

The switch tongue is provided at its rear end with an inwardly bent portion 71 which carries the terminal 72 with which the second line wire 75 is connected.

On its front end the switch tongue carries an insulating knob 76 permitting to slide it within the groove with the finger of the hand holding the handle 22.

In order to accommodate the inwardly projecting bent portion 71 the handle is provided with a radial slot 74 of such width that the portion 71 may be moved therein during the movement of the switch tongue. The terminal 72 may thus be located in the interior of the handle and the line wires may, therefore, both enter at the front end 73 of the handle.

The second contact of the switch 80 which cooperates with the shiftable switch tongue 69 is formed by the ring 60. When the tongue is moved towards the tip piece of the soldering iron its front end enters the tapering end 81 of the groove and is, therefore, pressed towards the ring 60. To hold the tongue in its place several rings 83 may be placed around the handle at convenient places. In the hollow rear end 73 of the handle a cable protecting spring may be fixed which is wound around the two cables 55 and 75 in order to prevent bending and for general protection in the well-known manner.

The modification illustrated has been designed for a soldering iron to be used in connection with a low volt battery such as the battery of a car, one end of which is grounded. This grounded end is connected with the line wire 75 and the switch tongue. In the event that higher voltages not grounded at one end are used the handle may be enclosed in a further sleeve of plastics or other insulating material, provided with a slot through which merely the plastic knob of the switch tongue projects.

The soldering iron when used for repair work has the main advantage that it will heat up within such a short time that the heating may be called instantaneous, upon pressure of the switch. Its construction is simple and is such that it will stand rough treatment without ever getting out of order. The renewal of the carbon when used up is an extremely simple manipulation. Therefore, if necessary, different carbons for different jobs may be held in readiness and may be interchanged according to requirements.

It will be clear to the expert that the details of the soldering iron may be varied without departing from the spirit and essence of the invention.

What I claim is:

1. A soldering iron comprising a tip piece, a hollow sleeve attached thereto, a handle provided with a central bore, means for detachably attaching said sleeve to said handle, a carbon electrode axially arranged within said sleeve, and applied against said tip piece, an electrode holder and means to firmly hold said electrode on said holder, said holder extending through said sleeve and said handle, a guide sleeve open at one end and closed at the other end within the central bore of said handle, the closed end being provided with a slot through which the electrode holder passes, a disk closing the open end of the guide sleeve provided with a slot, through which the electrode holder passes, said electrode holder having thus a supported portion within the guide sleeve and a freely projecting portion within the hollow sleeve carrying the tip piece, a spring means to hold one end of said spring on the disk closing the guide sleeve, means for attaching the other end of said spring on the supported portion of the electrode holder, a terminal post on said electrode holder and means to supply said terminal post with electric current.

2. In a soldering iron, a tip piece, a sleeve attached thereto, provided with a bayonet slot, a handle, means for detachably connecting said sleeve with said handle, said means comprising a metallic ring on said handle, screws provided with projecting ends engaging said bayonet slots, said screws establishing electric contact between said metallic ring and said sleeve and tip iron, a switch arranged within said handle consisting of a shiftable tongue adapted to make contact with said metallic ring, a source of current, means for connecting said metallic tongue with said source of current, a carbon electrode applied against said tip piece, means to hold the carbon electrode permanently pressed against said tip piece and means to connect the carbon electrode with the second pole of the aforesaid source of current.

3. A soldering iron comprising a tip piece, a hollow pencil-like sleeve connected therewith, a carbon electrode arranged in the axis of the sleeve and applied against the tip piece, a carbon electrode holder rod arranged eccentrically on one side of the pencil-like sleeve and in substantial parallelism with the axis of said sleeve, a handle separable from the pencil-like sleeve, a guiding sleeve within said handle, means for guiding the carbon electrode holder rod eccentrically but in substantial parallelism to the axis of the pencil-like sleeve, spring means for pressing said carbon electrode holder rod towards the tip piece, centering and clamping means for holding said carbon electrode centered on the axis of the sleeve and firmly clamped laterally and in substantial parallelism to and along the eccentric carbon electrode holder rod and means for supplying said rod with current.

4. A holding, advancing and current supply means for the heating elements of soldering irons with a tip piece, a pencil-like sleeve connected with it, and a guiding sleeve, the said heating element consisting of a carbon electrode applied against said tip piece, said holding advancing and current supply means comprising a carbon electrode holding rod arranged eccentrically with respect to the axis of said pencil-like sleeve, inclined lugs on said holding rod, a clamping sleeve arranged substantially centrically, encircling said rod and said electrode and holding the latter in a centered position with respect to the axis of the pencil-like sleeve, said clamping sleeve being provided with inclined slots, cooperating with the lugs on the carbon electrode holder rod, for pressing the electrode into contact with the rod and holding it in longitudinal alignment with the rod, a spring encircling the rod and the carbon electrode, attached to said rod and to the clamping sleeve, and providing an additional guiding means for holding the carbon electrode in a centered position, and spring means attached to said carbon electrode holder rod for advancing the same towards the tip piece attached to said guiding sleeve.

ALBERT R. SHAY.

REFERENCES CITED

The following references are of record in the file of this patent:

UNITED STATES PATENTS

| Number | Name | Date |
|---|---|---|
| 1,246,441 | Little | Nov. 13, 1917 |
| 1,491,389 | Frykman | Apr. 22, 1924 |
| 1,533,959 | Wagner | Apr. 14, 1925 |